United States Patent [19]

Harrington et al.

[11] Patent Number: 5,715,133
[45] Date of Patent: Feb. 3, 1998

[54] METHOD OF PRODUCING ALUMINUM FOIL FOR ELECTROLYTIC CAPACITORS AND PRODUCT THEREOF

[75] Inventors: Albert Kennedy Harrington, West Columbia, S.C.; Thomas Flavian Strange, Hampton Cove, Ala.; Roland F. Dapo, Columbia, S.C.

[73] Assignee: Philips Electronics North America Corporation, New York, N.Y.

[21] Appl. No.: 569,513

[22] Filed: Dec. 8, 1995

Related U.S. Application Data

[63] Continuation of Ser. No. 493,044, Jun. 21, 1995, abandoned.

[51] Int. Cl.$^6$ .................... H01G 9/00; C25F 3/04
[52] U.S. Cl. .................... 361/500; 216/6; 216/56; 216/96; 216/100; 216/102; 205/640; 205/674; 205/687; 205/704
[58] Field of Search ............ 216/96, 100, 102–104, 216/6, 56; 205/640, 674, 684, 687, 704; 361/500

[56] References Cited

U.S. PATENT DOCUMENTS 3,779,877  12/1973  Alwitt.
4,276,129  6/1981   Kanzaki et al..
4,279,714  7/1981   Arora et al..
4,609,971  9/1986   Shaffer.
5,143,591  9/1992   Shaffer ................... 205/50
5,503,718  4/1996   Kakizakai ................ 216/6

Primary Examiner—Bot L. Ledynh
Attorney, Agent, or Firm—Ernestine C. Bartlett

[57] ABSTRACT

An electrochemical cell for etching a metal workpiece such as an aluminum foil, a method for etching the foil using the electrochemical cell, and foil thus produced is provided. The cell includes an etch tank having an etch electrolyte disposed therein and containing at least a first and a second compartment each containing (i) an etch electrolyte, (ii) a cathode plate, and (iii) an ion exchange membrane separator portion comprising an ion exchange polymeric material effective to substantially retard or prevent reduction of the oxidizing agent or agents present in the etch electrolyte, the first and second compartments being arranged in the etch tank with the ion exchange membrane separator portions in facing relationship one to the other; and a metal workpiece such as an aluminum foil anode present in the etch tank and disposed between each said first and second compartments.

18 Claims, 1 Drawing Sheet

METHOD OF PRODUCING ALUMINUM FOIL FOR ELECTROLYTIC CAPACITORS AND PRODUCT THEREOF

This is a continuation under 37 C.F.R. 1.53 of application Ser. No. 08/493,044, filed Jun. 21, 1995, now abandoned.

FIELD OF THE INVENTION

The present invention relates to a method for producing an aluminum capacitor foil and to such a foil produced by this method. More particularly, the invention relates to a method of producing an aluminum anode foil useful in stacked capacitor designs.

BACKGROUND OF THE INVENTION

Electrolytic capacitors typically comprise a metal oxide dielectric layer which is electrochemically formed on the surface of a metal anode. Such capacitors may be, for example, as disclosed in U.S. Pat. Nos. 4,609,971 and 5,143,591, both commonly assigned herewith. In such capacitors, for example, a conductive electrolyte is disposed in intimate contact with the outer surface of the dielectric. The metal anode forms one electrode of the capacitor while the conductive electrolyte forms the second electrode. The use of such metal anodes commonly involves anodization. Anodization is a well known electrochemical reaction wherein a film is grown on the anode in an electrochemical cell according to the basic equations

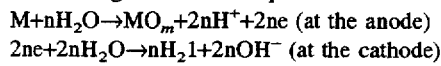

$M+nH_2O \rightarrow MO_m+2nH^++2ne$ (at the anode)

$2ne+2nH_2O \rightarrow nH_2\uparrow+2nOH^-$ (at the cathode)

An oxide is formed on the metal anode surface and hydrogen is evolved at the cathode. Anodization usually is undertaken in an aqueous electrolyte. At the anode, the reaction with the larger electronegative potential will occur. Oxide films can be prepared by methods well known in the art wherein a constant current is passed through the cell, the film thickness is proportional to the time for which the current is passed, and the voltage developed across the oxide film is a measure of the film thickness; or film may be formed under constant voltage conditions, all as is well known in the art.

Various processes are used to etch aluminum foil to make it suitable for use as and to enhance its properties when it is used as the anode in such electrolytic cells as described above. For example, it is customary to etch the foil surfaces to form microscopic holes and thereby increase the effective surface area (which foil surfaces may be masked to etch only selected areas as desired), and then to subject the foil to anodic oxidation to increase the electrostatic capacity of an electrolytic capacitor using such a foil. However, in the conventional etching techniques, dissolution of the aluminum foil surface either tends to proceed preferentially over the growth of the etching holes or etching proceeds slowly and inefficiently because of the ineffectiveness of the etch electrolyte and/or the rapid depletion of one or more essential components of the etch electrolyte.

SUMMARY OF THE INVENTION

An object of the present invention is to provide an improved method for etching aluminum anode foil.

Another object of the invention is to provide an electrochemical cell that is useful in the improved method of producing an aluminum anode foil.

Yet another object is to provide electrolytic capacitors, with improved properties, that are derived from the improved aluminum anode foil produced by the method of the invention.

These and other objects of the invention are realized by the present invention in which a very high capacitance anode (VHCA) aluminum foil is provided which is useful particularly in a stacked capacitor design.

Such VHCAs are readily produced according to the invention by a method in which aluminum foil is etched using half-cell etching in an electrolytic cell which comprises an etch tank having an etch electrolyte disposed therein and containing at least a first and a second compartment each containing (i) an etch electrolyte, (ii) a cathode, and (iii) an ion exchange membrane separator portion comprising an ion exchange material effective to substantially retard or prevent reduction of the oxidizing agent or agents present in the etch electrolyte, said first and second compartments being arranged in the etch tank with the ion exchange membrane separator portions in facing relationship one to the other; and wherein the aluminum foil to be etched forms an anode in the etch tank disposed between the facing ion exchange membrane separator portions of the first and second compartments.

The electrolytic cell may comprise an etch tank of polyvinylchloride or other suitable material having two or more compartments that are closed to the main etch tank except through ion exchange separator membrane portions of said compartments. The membranes are open to the tank and are opposed preferably 180° although this is not critical as long as they are positioned so that a sufficient flow for an electrolytic etch is achieved. The compartments contain the cathodes and the etch tank contains the anode. Electrolyte is present in each compartment, the solutions are brought to the desired temperature, stirring means is incorporated, if desired, and a current is applied resulting in an electrochemical etch. The etch is a result of the electrochemical action on the anode foil. Thus, using the electrolytic cell, aluminum foil is etched by the half-cell electrochemical etching with ion exchange membrane which greatly diminishes the rate at which oxidizing agents of the etch electrolyte are depleted by reduction at the cathode. The oxidizing agents remain largely unaffected by the cathode which would otherwise reduce the oxidizing components and deplete the effectiveness of the electrolyte solution. This arrangement also makes it possible to use stronger oxidizing agents which are believed to significantly contribute to the accomplishment of the very high capacitance anode aluminum foils produced herein.

Any suitable metallic material may be used as the cathode of the electrochemical cell. Preferably, such material will be titanium. Other suitable materials for the cathode include gold, platinum, other noble metals that are relatively inert conductor metals; graphite, copper, tantalum, etc., depending on the composition of the electrolyte.

The electrolyte may include such components as are well known in the art and may include any number of oxidizing agents, for example iodic acid, iodine pentoxide, iodine trichloride, sodium perchlorate, sodium persulfate, sodium peroxide, hydrogen peroxide, sodium pyrosulfate, and mixtures thereof, preferably sodium perchlorate, sodium persulfate in combination with aqueous solutions of alkali metal halides such as sodium chloride.

The ion exchange separator membrane may be any separator membrane that is effective to permit the electrochemical conduction of charge while excluding certain ions, especially the oxidizers from the cathode compartment thereby avoiding undue reduction of the oxidizing agents present in the electrolyte. Especially effective and therefore preferred herein are TEFLON-supported perfluorinated polymeric ion exchange membranes available commercially under the trademark NAFION and especially NAFION 417, a perfluorinated membrane, hydrogen ion form having an equivalent weight of about 1,100, and reinforced NAFION NE 450. Such membranes, as well as the monomers from which they are derived are well known in the art. Filter paper, fritted glass and salt bridges have been used with varying degrees of success. Fritted glass and salt bridges incur high resistivity while filter paper allows diffusion through the membrane or disintegrates over time and thus are not preferred herein.

Generally, an impressed current density in the range of 0.08 to 0.35 A/scm, preferably 0.15 to 0.17 A/scm, can be employed. The electrochemical reaction may be performed under controlled-potential mode or constant-current mode using commercially available equipment as is well known in the art.

The reaction is carried out at about 75° C. to 90° C., preferably 80° C. to 86° C.

The amount of electricity consumed in the reaction can be monitored using a coulometer.

Components of the apparatus other than the coulometer can be present as needed. For example, those skilled in the art may also consider the use of multimeters to monitor voltage and current, stirrer bars and a water bath for maintaining constant temperatures, etc.

DETAILED DESCRIPTION OF THE PREFERRED EMBODIMENTS

Electrolytic Cell

Figure 1:
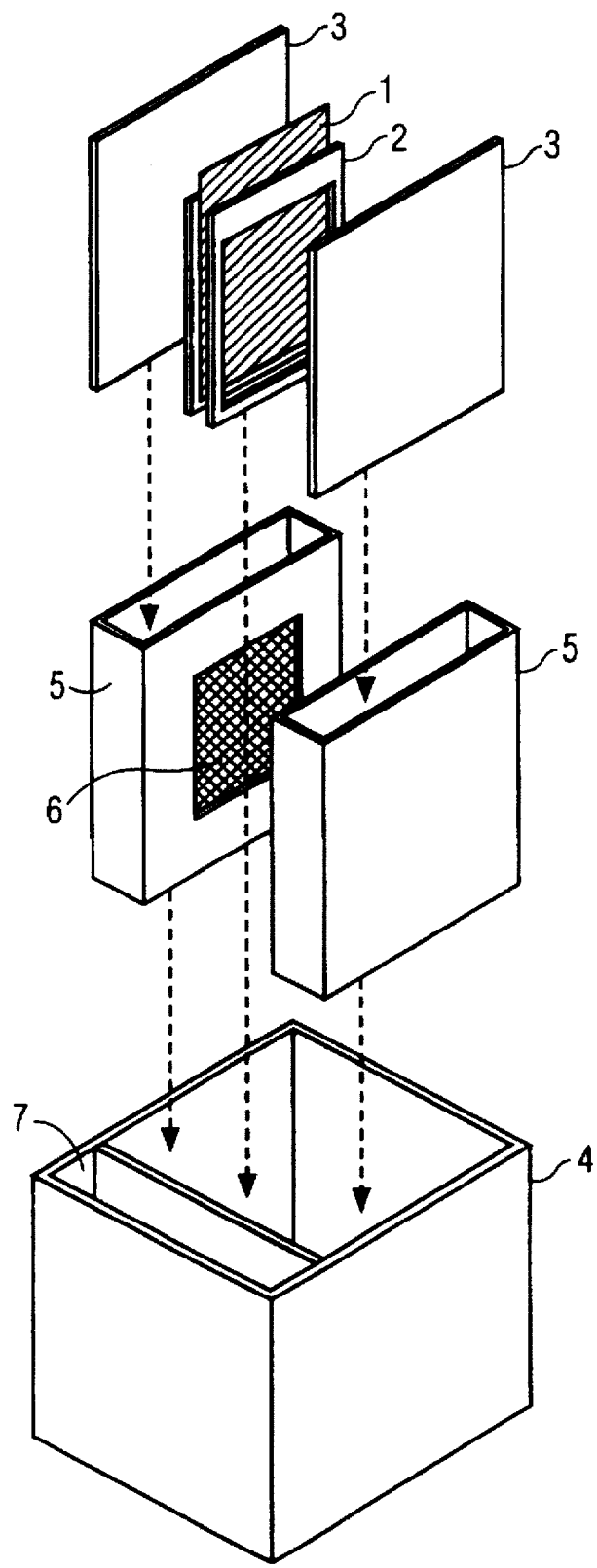
FIG. 1 is an exploded view of an electrolytic cell of the invention which is used in the production of etched aluminum anode foil in accordance with the invention.

With reference to the FIGURE, an electrolytic cell of the invention is illustrated wherein 110 micron thick, high cubicity aluminum foil 1 slit to an approximately 7 inch width, preferably in a foil holder 2 is placed in an etch tank 4 which contains an etch solution (not shown)comprising about 1.3% by weight sodium chloride, 3.5% by weight sodium perchlorate, 0.35% sodium persulfate, and deionized water. Cathode boxes 5, which also contain an etch electrolyte, which may be the same or different from the etch electrolyte contained in the etch tank 4, form a first and second compartment in the etch tank when placed therein. Each cathode box 5 also comprises an ion exchange separator membrane portion (NAFION 417) 6 arranged in the tank 4 with the portion 6 facing inwards. A titanium cathode plate 3 is placed in each cathode box 5 having the etch solution. The foil 1, optionally placed in a foil holder 2, which may be suitably configured to mask areas of the foil where etching is undesired, is placed in the etch tank 4 between the cathode boxes 5 to complete the electrolytic cell construction. There is also illustrated a third compartment 7 which is optional and may be used as an overflow to add components to the etch tank as desired. A current is applied, the mixture is electrolyzed, and the anode aluminum foil is thus etched in accordance with the steps of the process and representative conditions for such steps are as set out in the Table which follows:

TABLE

| Process Step | Current (A/scm) | Time (sec) | Temperature (°C.) | Voltage (V) | Medium |
|---|---|---|---|---|---|
| 1. Preclean | 0 | 20 | 25–35 | 0 | Preclean Solution |
| 2. Rinse | 0 | 120 | 10–40 | 0 | Deionized Water |
| 3. Etch | 0.15 | 250–267 | 75–90 | 12.5 | Electrolyte |
| 4. Rinse | 0 | 180 | 10–40 | 0 | Deionized Water |
| 5. Dry | 0 | 150 | 85–105 | 0 | Oven |
| 6. PostEtch | 0.15 | 520 | 65–75 | 2.5 | $H_2NO_3$ solution |
| 7. Rinse | 0 | 240 | 10–40 | 0 | Deionized Water |
| 8. Dry | 0 | 150 | 85–105 | 0 | Oven |

Etching of Foil

Samples of aluminum foil were precleaned using a diluted sodium hydroxide solution available commercially as Hubbard Hall Lusterclean and the precleaned samples were then rinsed and placed in the cathode compartment of the etch tank, the flow rate of which had been adjusted down to 1 liter/min. prior to etching. The sample is then placed in the etch tank and a current applied thereto as indicated in the Table. It is important that current be applied to the sample as soon as possible after placement of the same in the etch tank.

We have found using the particular materials and conditions indicated above that current must be applied no later than about five seconds after the sample is inserted into the solution to avoid undesirable hydration which interferes with the etching process. This time may vary depending on the parameters and conditions and the specific electrolyte solutions that are used.

We have also found that spotty or non-uniform etching may occur if the ion exchange membrane becomes clogged or is not properly positioned relative to the foil sample. Preferably, the size and positioning of the membrane separator portion of the cathode plate will coincide with the portion of the anode aluminum that is to be etched. After etching was completed, the samples were removed from the etch tank, rinsed and transferred to a post-etch tank having graphite cathodes, a post-etch solution comprising nitric acid and aluminum nitrate, and otherwise being of the same construction as illustrated in FIG. 1. After the post etch is complete, the samples are rinsed, dried and stored for processing into capacitors.

The sample thus etched was weighed to determine the extent of etching as measured by the weight loss and a weight loss of 11.5 to 12.5 mg/cm$^2$ was recorded.

Capacitors have been produced from the rolled foil when formed at 560 V that exhibit a capacitance-voltage (CV) product of about 360 CV compared to a capacitance-voltage (CV) product of about 290 CV when using a foil that is not prepared using the electrolytic cell of the invention.

(Comparative 1)

The above procedure was repeated using an electrolytic-cell that is the same as illustrated in FIG. 1 except that the cathode boxes were eliminated, the aluminum foil anode was sandwiched between the cathode plates and the cathode plates and the anode aluminum foil were placed directly in the etch tank in contact with the electrolyte. Etching had to be discontinued after approximately 6 samples had been etched or 240 coulombs passed because of near depletion of the persulfate oxidizer from the electrolyte present in the etch tank.

(Comparative 2)

The above procedure was repeated using an electrolytic cell that is the same as illustrated in FIG. 1 except that an isotactic, polypropylene microporous flat sheet membrane with submicron porosity available commercially as CELGARD was substituted for the NAFION ion exchange separator membrane. No etching of the anode foil occurred. The membrane appears to restrict the flow of electrons between the anode and cathode to the extent that there is no current flow and etching cannot take place electrochemically.

While the invention has been described and illustrated in terms of the preferred embodiment described above, it is to be understood that understood that modifications and variations may be resorted to without departing from the spirit and scope of the invention as will be readily understood by those skilled in the art.

We claim:

1. An electrochemical cell for etching a metal workpiece, which comprises:

an etch tank having an etch electrolyte disposed therein and containing at least a first and a second compartment each containing (I)an etch electrolyte, (ii) a cathode plate, and (iii) an ion exchange membrane separator portion comprising an ion exchange polymeric material effective to substantially retard or prevent reduction of the oxidizing agent or agents present in the etch electrolyte, said first and second compartments being arranged in the etch tank with the ion exchange membrane separator portions in facing relationship one to the other; and a metal workpiece anode present in the etch tank and disposed between each said first and second compartments.

2. A method of etching an anode metal workpiece comprises applying a current to an electrochemical cell as claimed in claim 1.

3. An electrochemical cell as claimed in claim 1 wherein said cathode plates comprise titanium.

4. A method of etching an anode metal workpiece which comprises applying a current to an electrochemical cell as claimed in claim 3.

5. An electrochemical cell as claimed in claim 1 wherein the ion exchange membrane is a perfluorinated polymeric ion exchange membrane.

6. A method of etching an anode metal workpiece which comprises applying a current to an electrochemical cell as claimed in claim 5.

7. An electrochemical cell as claimed in claim 1 wherein the electrolyte comprises an aqueous solution of sodium chloride, sodium perchlorate and sodium persulfate.

8. A method of etching an anode metal workpiece which comprises applying a current to an electrochemical cell as claimed in claim 7.

9. An electrochemical cell as claimed in claim 7 wherein said cathode plates comprise titanium and the ion exchange membrane is a perfluorinated polymeric ion exchange membrane.

10. A method of etching an anode metal workpiece which comprises applying a current to an electrochemical cell as claimed in claim 9.

11. An electrochemical cell as claimed in claim 1 wherein the metal workpiece is a metal foil.

12. A method of etching an anode metal foil which comprises applying a current to an electrochemical cell as claimed in claim 11.

13. An electrochemical cell as claimed in claim 1 wherein the metal workpiece is an aluminum foil.

14. A method of etching an anode aluminum foil which comprises applying a current to an electrochemical cell as claimed in claim 13.

15. An electrochemical cell, for etching an aluminum foil suitable for use in an electrolytic capacitor, which comprises:

an etch tank having an etch electrolyte comprising at least one oxidizing compound selected from the group consisting of sodium perchlorate, sodium persulfate, sodium pyrosulfate and mixtures thereof disposed therein and containing at least a first and a second compartment each containing (I) an etch electrolyte which may be the same or different from the etch electrolyte contained in the etch tank and in the other said compartment; (ii) a titanium cathode plate, and (iii) a perfluorinated polymer ion exchange membrane separator portion effective to retard depletion of the oxidizing compound present in the electrolyte by reduction at the cathode, said first and second compartments being arranged in the etch tank with the ion exchange membrane separator portions in facing relationship one to the other; and an aluminum foil anode present in the etch tank and disposed between each said first and second compartments.

16. A method of etching an anode aluminum foil which comprises applying a current to an electrochemical cell as claimed in claim 15.

17. An electrochemical cell as claimed in claim 15 wherein the portion of the ion exchange membrane separator coincides approximately with the dimensions and positioning of the anode aluminum to be etched.

18. A method of etching an anode aluminum foil which comprises applying a current to an electrochemical cell as claimed in claim 17.

* * * * *